(12) United States Patent
Wheatley

(10) Patent No.: US 7,881,249 B2
(45) Date of Patent: *Feb. 1, 2011

(54) METHOD AND APPARATUS FOR DETERMINING REPEATER USE IN WIRELESS COMMUNICATIONS

(75) Inventor: Charles E. Wheatley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1584 days.

This patent is subject to a terminal disclaimer.

(21) Appl. No.: 10/527,297

(22) PCT Filed: Apr. 16, 2004

(86) PCT No.: PCT/US2004/011816

§ 371 (c)(1),
(2), (4) Date: Mar. 3, 2005

(87) PCT Pub. No.: WO2004/095733

PCT Pub. Date: Nov. 4, 2004

(65) Prior Publication Data

US 2006/0040616 A1 Feb. 23, 2006

Related U.S. Application Data

(60) Provisional application No. 60/483,209, filed on Jun. 27, 2003.

(51) Int. Cl.
*H04B 7/216* (2006.01)

(52) U.S. Cl. .................. 370/320; 370/315; 370/492; 370/501; 455/9; 455/15; 455/23

(58) Field of Classification Search ............ 370/277, 370/279, 293, 310.2, 315, 319, 320, 321, 370/322, 326, 492, 501; 455/3.05, 11.1, 455/15, 16, 426.1, 450, 451, 452.1

See application file for complete search history.

(56) References Cited

U.S. PATENT DOCUMENTS 6,501,955 B1 * 12/2002 Durrant et al. ........... 455/456.1
6,961,367 B2 * 11/2005 Simic et al. ................ 375/214

(Continued)

FOREIGN PATENT DOCUMENTS

WO 02087275 10/2002

OTHER PUBLICATIONS

International Search Report and Written Opinion—PCT/US04/011816, International Searching Authority—European Patent Office, Nov. 29, 2004.

(Continued)

*Primary Examiner*—Donald L Mills
(74) *Attorney, Agent, or Firm*—Linda G. Gunderson

(57) ABSTRACT

A method and apparatus for determining whether a received signal is transmitted via a repeater is described. A source signal to be conveyed via a particular repeater may include, or be modified to include, a variety of signal characteristics having a predictable relationship that remains relatively constant, which may be taken together as a signature of the repeater. The signature may reflect a composite of distinct signals. A database of repeater signature references may be developed, and an adequate match between characteristics of an unknown received signal and such signature references indicates that at least part of the unknown signal is transmitted via a repeater. Useful signal characteristics for repeater signatures may include some representative of signal strength, and time of arrival information, among many other possibilities.

25 Claims, 5 Drawing Sheets

U.S. PATENT DOCUMENTS

| | | | |
|---|---|---|---|
| 7,016,688 B2* | 3/2006 | Simic et al. | 455/456.1 |
| 7,062,224 B2* | 6/2006 | Baker et al. | 455/9 |
| 7,429,951 B2* | 9/2008 | Kennedy et al. | 342/465 |
| 2003/0220075 A1* | 11/2003 | Baker et al. | 455/17 |

OTHER PUBLICATIONS

International Preliminary Report on Patentability—PCT/US04/011816, IPEA/US, Alexandria, VA Sep. 19, 2005.

* cited by examiner

METHOD AND APPARATUS FOR DETERMINING REPEATER USE IN WIRELESS COMMUNICATIONS

This application claims priority to U.S. Provisional Application No. 60/463,927, filed Apr. 17, 2003.

BACKGROUND OF THE INVENTION

1. Field of the Invention

This invention generally relates to wireless communications, and, more specifically, to wireless communications networks that employ repeaters.

2. Related Art

It is often useful to extend the range of a communications network by adding repeaters. Many repeaters process signals by simply obtaining an input from a "donor" source, amplifying it, and then transmitting it at a "server" antenna. In some cases the repeater may modify the repeated signal, for example encapsulating packet data to be repeated within packets composed by the repeater. In many other situations, however, it may be useful for the repeater to be "transparent," that is to provide the same signal from the repeater server antenna as is presented to the repeater donor antenna, so that network processing may often proceed without particular regard to the repeaters.

Repeaters may be utilized in a number of geometric configurations. FIG. 1 illustrates a repeater obtaining a signal from a donor antenna 102 disposed on top of a building 104. The donor antenna 102 may be configured to preferentially receive signals from a selected base station transmitter. For example, a moderately directional Yagi antenna aligned with a sector c transmitter of a base station BS1 106 preferentially receives signals transmitted from sector c of BS1 106. The base station BS1 106 is shown in a typical configuration for cellular telephone base stations, having three sectors identified as a-c. Each sector may be provided with a distinct RF transmission signal.

The donor antenna 102 is coupled, for example via an amplifier 108, to one or more server units 110. A server unit 110 may, for example, be provided on each floor of the building 104 to facilitate reception by receivers, such as MS-2 112, whose reception might otherwise be impaired because of being located within the building. The forward path from a base station to a receiver is illustrated in FIG. 1. Reverse paths from a receiver, such as MS-2 112, to a base station, such as BS1 106, are typically provided in a complementary manner, but are not shown or described extensively.

FIG. 2 illustrates a repeater configuration that may be used, for example, to extend the geographical coverage range of a cellular system. Supported at a location 202 that may be on a tower, high building or other relatively unobstructed site, the repeater 212 includes a donor antenna 204, an amplifier 206, and a server antenna 208. The donor antenna 204 is shown as a parabolic antenna aligned to a primary base station 210, but may also be a less directional antenna. The server antenna 208 generally broadcasts the signal over a relatively wide area, with coverage that may be similar or even broader than the coverage of the transmission from an ordinary base station sector.

FIG. 3 illustrates a repeater configuration that is frequently used for server antennas, such as server antenna 302, that are far removed from a primary signal source, such as a base station 304. A donor pickup device may be located within the base station 304. A signal may be provided to the pickup device 306 in many possible ways, some of which are indicated by broken lines. For example, the signal may be provided from a coupler 308 in a transmission line to a final RF amplifier 310. Alternatively, the signal may be provided from a coupler 312 subsequent to the amplifier 310, or it may be picked up by an antenna 314 that is closely coupled to a transmission antenna 316 of the base station. The signal obtained by the donor pickup 306 is then conveyed via a repeater link 318. The repeater link 318 may include extensive RF transmission lines and amplifiers to convey the signal a substantial distance to a final repeater amplifier 320 prior to the server antenna 302.

However, the repeater link 318 need not maintain the signal in the same form in which it is received from the base station 304. For example, the repeater link 318 may convert the signal received from the donor pickup 306 to an intermediate form having a different modulation or signaling scheme, so that the signal can be transferred via a special repeater link mechanism. Such repeater link mechanism may include fiber optics, or microwave relay stations, or any other suitable mechanism. The intermediate form may, for example, include encapsulating the information in the received signal within a frame structure uniquely employed by the special repeater link mechanism. Before presentation to the final repeater amplifier 320 and transmission from the server antenna 302, the signal is typically converted back into substantially the same form of modulation and signaling scheme it would have had if transmitted directly from the base station antenna 316. Many repeater configurations are variations upon those illustrated in FIGS. 1-3, and there are other geometries as well.

"Transparency" is a design goal for many repeaters, so that they may be employed in a system without requiring special accommodation. For many purposes, a system need not even take note as to whether or not a repeater is included in a transmission path. However, as set forth more particularly in the detailed description below, in some instances there is a need to know that a signal has traveled via a repeater, even if the repeater has been designed to be transparent to the system.

SUMMARY

In one aspect, a method of determining that a signal has arrived at a receiver via a repeater is presented, including steps of receiving a signal at a receiver, comparing a predetermined pattern to information derived from the received signal, and determining, based upon the predetermined pattern substantially matching the information derived from the received signal, that some portion of the received signal traveled via a repeater.

Another aspect includes apparatus that may be used for determining that a signal has arrived at a receiver via a repeater. The apparatus includes a receiver to derive information from a received signal, and a processing system in communication with the receiver that is configured to compare the derived information to a stored set of predetermined parameters, and to determine that some portion of the received signal arrived via a repeater if the set of predetermined parameters describes an appropriate part of the derived information.

Yet another aspect includes a method of providing a composite signal to a repeater for distinguishing signals transmitted via the repeater from similar signals not transmitted via the repeater. The method includes obtaining a primary signal from a donor transmitter system, summing at least one different secondary signal with the primary signal to create the composite signal, and amplifying the composite signal for transmission from a repeater server antenna.

A further aspect includes apparatus for establishing a composite signal to be transmitted by a repeater as identification of the repeater. The apparatus includes a primary signal source coupled to a mixer via a first coupler, and a different secondary signal source coupled to the mixer via a distinct second coupler. The apparatus also includes a distinct third coupler connecting an output of the mixer, which includes a composite of signals from the primary signal source and from the secondary signal source, as an input to the repeater.

BRIEF DESCRIPTION OF THE DRAWINGS

Embodiments of the present invention will be more readily understood by reference to the following figures, in which like reference numbers and designations indicate like elements.

DETAILED DESCRIPTION

Despite the fact that many repeaters are intentionally designed to be transparent to the communication system in which they are used, such a system may benefit from determining that a receiver has received a signal that has been transmitted by a repeater. For example, there are many circumstances in which knowledge about a location of system stations, particularly mobile stations, is desired. Methods that are used to determine such locations may utilize information about received signals, and may rely upon knowledge (or assumption) about a path traveled by such received signals. Therefore, failure to identify the actual path by which the signal travels could preclude making correct deductions based on analysis of such signals.

Location information may be of interest at several levels. First, it may be useful to narrow down the location of a mobile station (MS) in a cellular telephone system to the coverage area of a particular base station. Closer information about a MS location may be useful to predict which base station will be best to "hand off" the MS upon signal fade from its present primary base station. Location information may also be useful for navigation aids, and for safety services such as locating the source of 911 calls.

Figure 3:
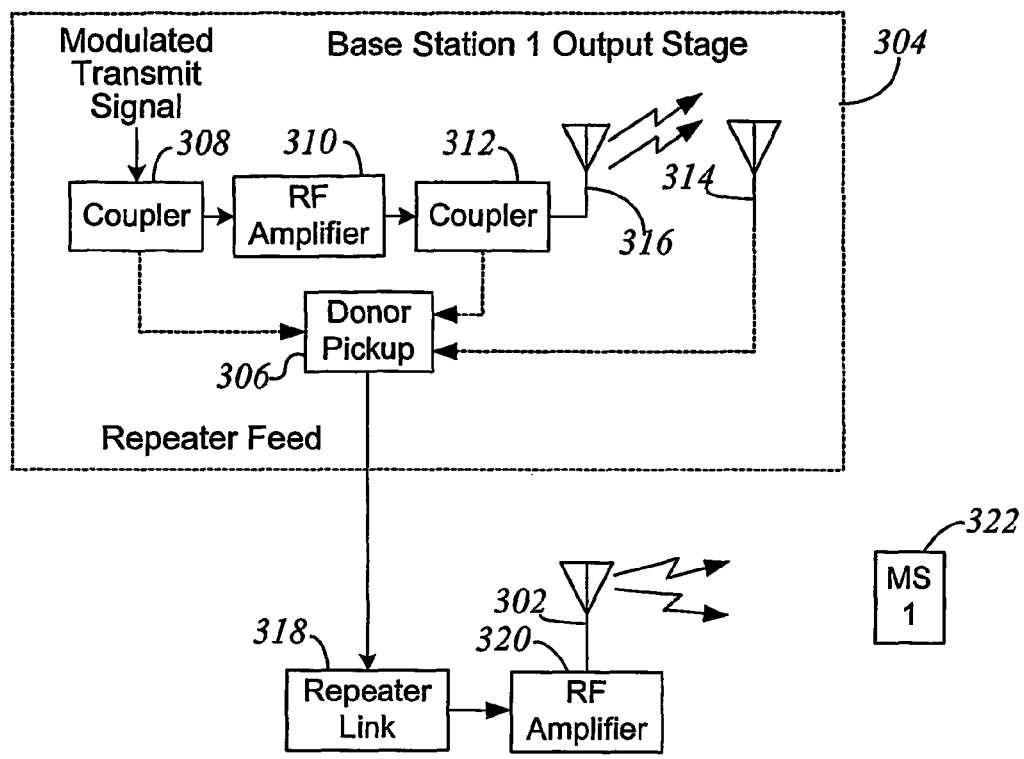
FIG. 3 illustrates features of a third geometric configuration of communications repeaters.
Figure 3:
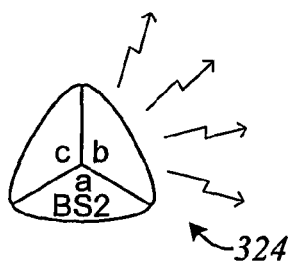
Figure 3:
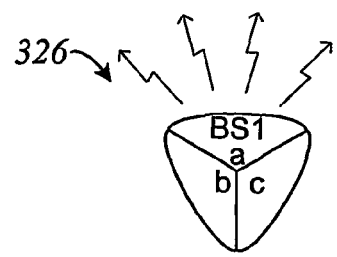

It will often be necessary to identify the path of received signals in order to correctly use information about such signals for location estimation. Referring for a moment to FIG. 3, for example, it may be desired to know something about the location of a receiver MS1 322. MS1 322 receives a signal that it identifies as having originated from a Base Station 1 304, in particular from a sector that transmits via antenna 316. Such identification may be based upon recognition of particular content in the received signal, or recognition of a particular PN (pseudonoise) code offset in the pilot signal. Identification of the source might lead to a conclusion that MS1 322 is within the coverage area of Base Station 1 304, based upon an assumption that the signal traveled from the Base Station 1 304 directly to MS1 322, substantially along a Line Of Sight (LOS) path. If this assumption is incorrect, however, and MS1 322 is receiving the signal from a remote repeater server antenna 302 instead of by LOS transmission, then MS1 322 may in fact be miles outside the LOS coverage area of Base Station 1 304. Thus, a large error may accrue in an estimate of MS1 location if it is not known that the signal received by MS1 322 traveled via a repeater.

Figure 2:
FIG. 2 illustrates features of a second geometric configuration of communications repeaters.
Figure 2:
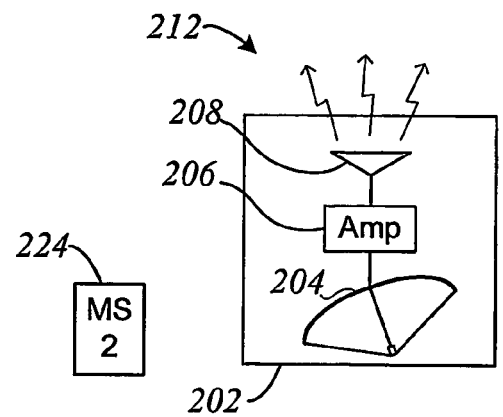
Figure 2:
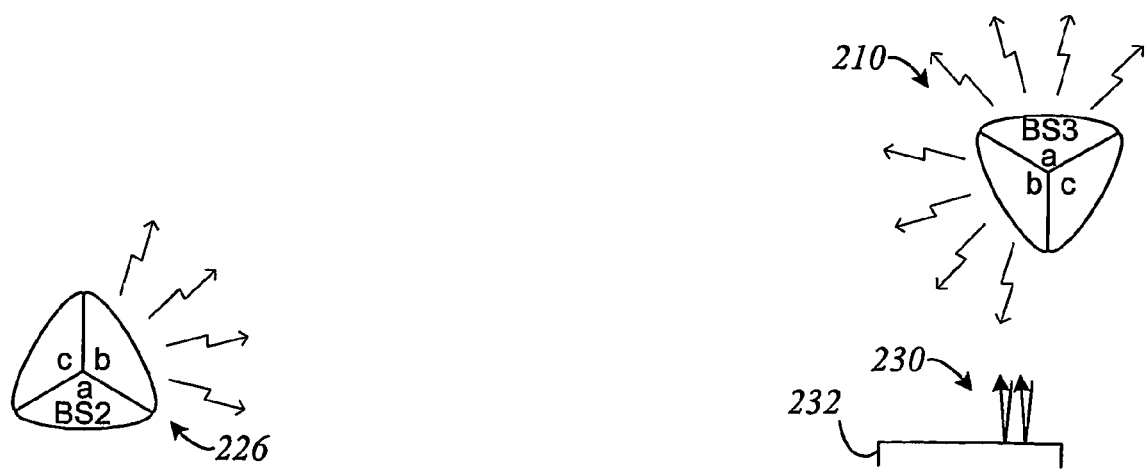

Receiver locations may also be calculated by ranging, based upon the transit time of signals. Such location calculations are subject to error or uncertainty if the actual path of a received signal is unknown. These calculations typically are based upon measures of a time of arrival (TOA) of signals from known locations, together with some form of triangulation. Referring to FIG. 2, MS1 222 is within the coverage of the repeater server antenna 208. A signal from sector "a" of base station BS3 210 to MS1 222 will actually travel first to the top of the building 202 from BS3 210, and after an "excess delay" introduced by the repeater 212, will travel from server antenna 208 to MS1 222. Not only is this actual path longer than a straight line LOS path from BS3 210 to MS1 222, but the actual path also contains added delay due to the repeater 212. If the travel time of this signal is used, either explicitly or implicitly, to estimate the location of MS1 222 assuming that the signal traveled via LOS, and if the received signal in fact traveled via the repeater 212, then a very substantial error will be introduced into the location estimate. Such an error could be avoided with knowledge of the actual path taken by the signal.

Thus, in many circumstances there may be a need to recognize that a signal has traveled via a repeater before being received by a receiving station. As described above with respect to FIG. 2, a failure to recognize that a signal traveled via a repeater may introduce errors into deductions about station locations that are based upon the characteristics of received signals. However, many repeaters transmit a signal from their server antenna(s) that is substantially identical to that which they receive from their donor sources, providing no ready mechanism by which to identify the actual path of a transmission. To address this deficiency, a method and apparatus are set forth below which, in various aspects, can be used for the purpose of determining whether a repeater is in the path of a wireless signal received by a receiver.

Detecting Repeated Signals

Many repeaters are designed not to modify the data content or modulation scheme of the signals they repeat, nor to actively provide identification information to enable a receiver to determine that a repeater is the proximate source of a received signal. Some repeaters may provide such identification information, yet some receivers may not be equipped to recognize the identification information. In either case, a method for determining that received signals have been repeated, and possibly to determine which such signals have been repeated, may be useful.

A general method that may be used to determine that received signals have been transmitted via a repeater involves identifying a predetermined signal pattern as a "signature" of the repeater. This general method may take a variety of particular forms. For example, a repeater signature may involve adding data, such as repeater identification data, to a signal that it is repeating, by encapsulating or modifying the repeated signal. As another example, a repeater signature may involve imposing an identifiable modulation on a repeated signal. As yet another example, a repeater may change some aspect of a signal format for repeated signals. The skilled person will be able to use one or more of these methods to create a recognizable pattern for a repeater signature by using signal processing techniques that are now known, or that are developed in the future, and thus solve the need to identify signals that have been conveyed via a repeater.

Composite Signal Signatures

A signature of a repeater that is based upon a composite of distinct signals that is conveyed by a particular repeater may, but need not, require explicit changes to data content or modulation of repeated signals. The signal input from a repeater donor source, such as a donor antenna, may include (or be modified to include) a combination of distinct signals. If a pattern or recognizable combination of signals is predictably present in the composite signal conveyed by a particular repeater, then recognition of the pattern of such a combination in a receiver may support a conclusion that the composite signal, and indeed each constituent component of the composite signal, has been conveyed via the repeater.

Any recognizable characteristic(s) of a signal may be exploited to identify a component of a composite signal. A combination of such characteristics may then establish a pattern that can be recognized as the signature of a repeater that predictably conveys a composite signal including the signature pattern. If not initially known, such a repeater signature pattern may be determined from an examination of signals conveyed by the repeater and saved as a reference pattern, for example in a database of such reference patterns. If the signals initially conveyed by a repeater are not satisfactory for ready identification of a signature pattern, then such a repeater signature may be created by adding signals to those otherwise conveyed by the repeater. Once a reference repeater signature is established and the pattern is known, signature parameters may be compared to information about signals of uncertain origin. Evidence that such signal was conveyed via a repeater is generated when information about the signal adequately matches the signature parameters. Sufficient matching may provide strong, or even conclusive, evidence that portions of the signal (those portions that match the signature) traveled via the particular repeater associated with the signature.

Signal Characteristics for a Signature

Many different recognizable characteristics are available in existing signals, or may be developed in future signals. For example, many data transmissions send data in packets, each header having identifying header information. Many data transmissions also transmit data in bursts, and each burst may be prefixed by a preamble that is used in part for aligning signal timing to facilitate decoding of the associated payload information. AM, FM and SSB signals may include special markers, such as periodic timing signals, and may be independently distinguishable simply on the basis of their frequency components. CDMA cellular telephone standards presently call for pilot signals that are temporally synchronized, and the base station sectors that produce such pilot signals may be distinguished on the basis of time offsets in the pilot signal pattern. Many systems transmit signals having features at a predetermined time location that is synchronized with a reference, for example synchronized to time indications provided by the Global Positioning System (GPS). Relative timing between signals, and relative timing of features within a given signal, may also provide identifying information.

Another characteristic of signals that may often help to distinguish a repeater composite signal signature is an indication that reflects a relative strength of component signals. Referring to FIG. 2, for example, it may be seen that a mobile station MS2 224 is near the repeater 212, and accordingly, similar signals may be present at MS2 224 as are present at the donor antenna 204. However, the donor antenna 204 will likely receive signals at substantially different relative amplitudes than will the mobile station MS2 224. In particular, if the donor antenna 204 is directional (as suggested by the parabolic antenna that is illustrated) then the signal from BS3 210 will be received with less attenuation than signals from, for example, sector b of a base station BS2 226. MS2 224, which presumably has an omnidirectional antenna, will receive these signals at different relative amplitudes as compared to the directional donor antenna 204. Thus, the relative amplitudes of received signals may be useful to distinguish signals received by MS1 222 (via the repeater 212) from signals received by MS2 224. Moreover, it is likely that MS2 224 and MS1 222 will receive signals from sector c of base station BS1 228 at a similar strength. However, because MS1 222 receives an amplified signal from the repeater 212, the relative amplitude of signals received from (for example) BS3 210 versus those received from BS1 228 will vary dramatically between MS1 and MS2;

Useful parameters that reflect signal strength may be derived from received signal information in any manner now known or later developed. Almost all cellular telephone handsets, for example, provide a measurement that reflects signal strength, which is generally reported on a user display. Signal strength parameters may reflect actual amplitudes of the signal of interest. For example, an indication of the power received in the portion of the electromagnetic spectrum that is assigned to the signal of interest may be used as such a parameter. In the case of CDMA cellular systems, one common measurement that reflects signal strength is known as EC/I0 (the energy per chip divided by the total energy within the spectral band used by the signal). A correlation process that identifies the existence and timing of received pilot signals produces "correlation peaks" whose magnitude reflects the strength of the signal as compared to noise. Such peak magnitudes, reflecting signal strength, may be used for distinguishing repeated signals from non-repeated signals, even though the correlation peak magnitudes are not a direct measure of signal strength in the traditional sense of actual RF signal power. Most measurements that reflect signal strength are relative in nature, though available "absolute" strength measurements would be suitable for use as a distinguishing characteristic. Because a signal characteristic needs merely to provide a basis for distinguishing between repeated signals and non-repeated signals, references to "an indication of signal strength" in this context should be broadly understood to connote any measurable characteristic of a signal that is substantially determined by the strength, signal-to-noise, clarity (absence of distortion), or other signal characteristic of similar type.

Pilot Sequence Detection and Correlation

Many different types of wireless communications periodically transmit symbol sequences, often called pilot words or pilot sequences, which are expected by a receiver. Such pilot sequences may be included as preambles to bursts of data, or may be disposed within payload data, or may be transmitted alone. Correlation of received signals with the expected pilot sequence may be used to determine a measure of relative signal strength or quality, and correlation peaks may also provide an indication of a temporal position of such pilot sequences.

In some systems pilot sequences are transmitted from different transmission stations at times that are synchronized to a common reference time, such as may be obtained from the well-known Global Positioning System (GPS). Synchronization provides predictability to the relative timing of signals from different transmission stations. Moreover, in most systems, pilot signals are transmitted from different stations at known, fixed power levels, which may provide predictability, also, for relative received signal power levels. Correlating received signals and expected pilot sequences may provide information about these two signal characteristics. The predictable relationship between such characteristics, as between signals from different transmission stations, may make such relationships useful for repeater signatures.

An example of correlating expected pilot sequences to received signals is set forth below. The example involves pilot signal detection in a CDMA cellular telephone system, particularly noting time of arrival and "signal strength" characteristics. The skilled person will understand that similar correlation techniques may be used with any system that transmits pilot sequences in a synchronous manner to obtain time of arrival and signal strength information. Moreover, despite the fact that both signal strength and time of arrival are suitable characteristics for creating or identifying a signature, these exemplary details should not obscure the fact that completely different signal characteristics, determined using different techniques, may also be used to obtain a composite signal signature from different types of signals.

CDMA cellular telephone system mobile stations demodulate received signals at an appropriate pilot frequency, and compare the received signals to an expected pilot sequence. This process produces a correlation peak profile that includes precise information about relative time of arrival of pilots from different sources, and also includes an amplitude component that is, functionally, an indication of signal strength for the received pilot. A standard pilot sequence for some CDMA systems is a pseudonoise ("PN") sequence that is 32,768 units ("chips") in length. The units, or chips, are defined by the maximum reversal rate of symbols in the signal. Accordingly, chip length is the length of a minimum symbol unit.

An exemplary CDMA cellular communication uses chips having a duration of approximately 0.8138 µs. More precisely, three complete PN sequences occupy four 20 ms frames in the exemplary system, such that each pilot PN sequence repeats every 26 ⅔ ms. Parameter values of typical CDMA systems, such as frequency, PN sequence length, chip duration, and so forth, may be selected for convenience in a particular implementation. More generally, the skilled person can follow the teachings herein in conjunction with a typical CDMA systems, and with communications systems other than CDMA (such as TDMA and AMPS).

The signal is received within a selected frequency range, and is digitized. The digitizing process may be done in many ways (now known or later developed), but typically has a net effect that is equivalent to reducing the signal to baseband and then sampling the baseband signal at a selected sample rate. The sample rate is typically selected to be an integer multiple of the chip rate. For example, the received signal may be sampled at 4 times the chip rate. The received signal is thereafter represented by the resulting sequence of digital sample data, {S(n)}. The received data sequence is examined for the presence of an expected pilot sequence by correlating the received data sequence with a stored data sequence that would be expected from a signal containing the pilot sequence.

Correlation techniques are known in the art, and any appropriate technique may be used. Typically, an N-sample expected pilot sequence {P(0):P(N−1)} is aligned with N sequential samples from the received data. At each of the N points, the data from the two sequences are multiplied together, and the results are summed over all N points:

$$C(m) = \sum_{n=0}^{N-1} S(m+n) * P(n)$$

The resulting sum is the correlation value for sample time m. Next, the N-point expected sequence is shifted by (for example) one sample period and the multiplication and summing are repeated to generate another correlation value C(m+1). If the sequence were shifted by p samples, the new correlation value would be C(m+p). Because CDMA cellular pilot sequences are repetitive (e.g., repeating every 32,768 chips), samples separated by the repetition period may be integrated to increase the signal. Thus, if the sample rate is 4 times the chip rate, every 131,072nd sample may be accumulated or integrated. Accordingly, for chips of 0.8138 µs duration, the pattern of integration peaks that is derived from received CDMA pilot signals should form a constellation of peaks that repeats every 26.6667 ms. The time of arrival of the signal will generally be determined to within +/−½ sample period. Hence, if the sample rate is 4 samples per a 0.8138 µs sample period, the basic time resolution is to within approximately ⅛ of the sample period, or +/−0.1 µs. However, algorithms for interpolating the raw correlation peak data may be employed to refine the resolution.

Different base station sectors in CDMA cellular telephone systems generally transmit the same pilot sequence. However, the pilot sequence from different sectors is synchronized differently with respect to the GPS time maintained at the sector, offsetting it in time. Each "offset" of the PN sequence is typically an integer multiple of 64 chips, which provides 512 differently-synchronized pilot sequences or "PNOffsets". Thus, all of the pilot signal transmissions that are detectable by a particular mobile station appear as a correlation peak that repeats every 32,768 chips. The skilled person will readily adjust for different chip periods.

Correlation Peak Constellation Examples

Figure 1:
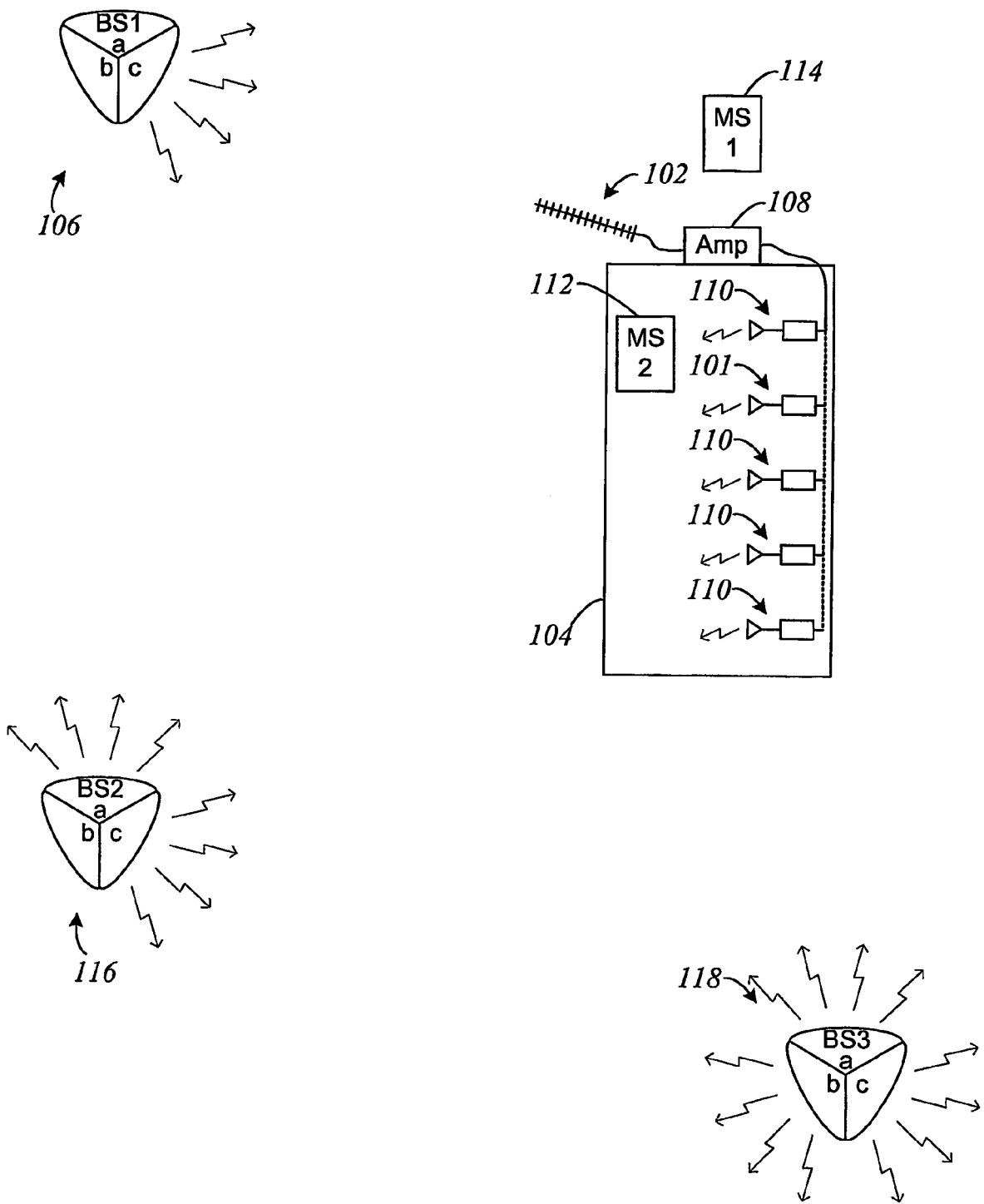
FIG. 1 illustrates features of a first geometric configuration of communications repeaters.
Figure 4:
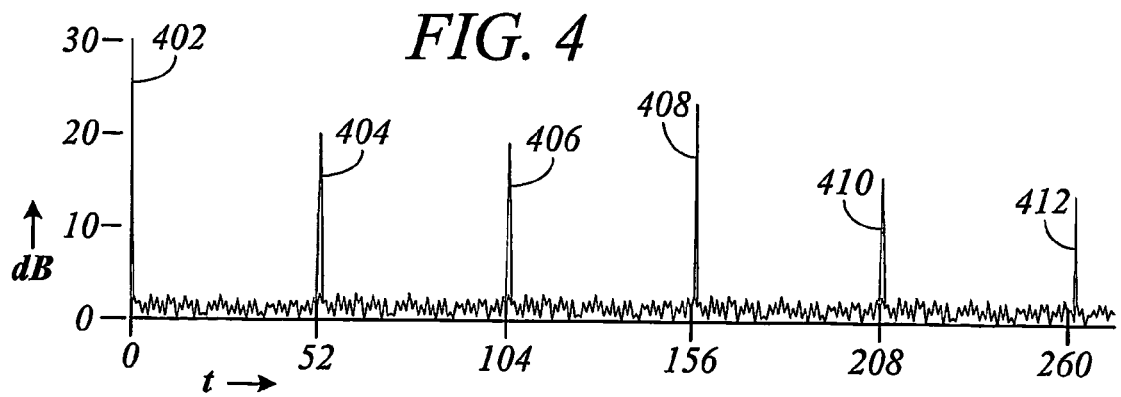
FIG. 4 is a graph of a relative Amplitude and Time Of Arrival (rATOA) constellation for signals received by a first mobile station.

FIG. 4 shows correlation peaks with respect to time in microseconds. The correlation peaks might be obtained by MS1 114 in the configuration illustrated in FIG. 1. A reference peak 402 may be treated as establishing t(0), and an internal clock of the mobile station may be synchronized to the reference peak 402. Peak 402 reflects the pilot signal transmitted from sector "c" of BS1 106 (FIG. 1). The PN code transmitted by sector c of BS1 106 is, conveniently for this illustration, at PNOffset(0). Sectors "a" and "c" of BS2 116 transmit pilot signals at PNOffsets 1 and 2 respectively, such that the respective sequence transmissions begin at a time that is delayed 64 and 128 chips, respectively, compared to the sequence transmission at PNOffset(0) from sector "c" of BS1 106. As such, the correlation peaks corresponding to pilot sequence transmissions from sectors "a" and "c" of BS2 116 follow t(0) by 64 and 128 chips (52.1 and 100.2 µs), respectively, due to their PNOffsets (or transmission time delay). The corresponding correlation peaks are further delayed by the longer signal travel time from BS2 116, as compared to the signal travel time from BS1 106. MS1 114 is 300 m from BS1 106, from which the signal arrives by LOS (line of sight) travel, thus corresponding to a 1 µs signal travel delay, and 600 m LOS from BS2 116, resulting in 1 µs extra travel time for signals from BS2 116 as compared to the reference signal from BS1 106, such that the correlation peaks 404 and 406 will follow the correlation peak 402 by 52.1 and 104.2 µs, respectively. Next, sector "a" of BS3 118 transmits the pilot signal at PNOffset 3 (192 chips, thus 156.3 µs delay), and the LOS signal path from BS3 118 to MS1 114 is 500 m long (1.7 µs total travel). Accordingly, the corresponding correlation peak 408 will appear at 156.3 µs after t(0). Correlation peak 410, delayed 208.4 its, reflects pilot signals received by MS1 114 from a sector "b" of a BS4 (not shown) using PNOffset 4 (208.4 µs delay) that is 900 m distant (2 µs added delay). Correlation peak 412, at 260.5 µs delay, is due to a pilot signal from a sector "b" of a BS5 (not shown) located 1050 m away (2.5 µs extra travel delay) and using PNOffset 5 (260.5 µs delay). The PNOffsets are selected to compress the time range of the correlation peaks, to simplify the illustration. Different base station sectors may be assigned any of the 512 available PNOffsets.

The magnitude of the correlation peaks tends to decrease by somewhere between $1/D^2$ and $1/D^4$, where D is the distance between stations. A value of $1/D^3$ will be assumed for illustration. In accordance with this assumption, the correlation peaks 402 (300 m from BS1(*c*)), 404 (600 m from BS2 (*a*)), 406 (also 600 m from BS2(*b*) but somewhat more on the fringe of the sector coverage), 408 (500 m from BS3(*a*)), 410 (900 m from BS4(*e*)), and 412 (1050 m from BS5(*f*)) appear at 30 dB, 20 dB, 19 dB, 23.3 dB, 15.7 dB and 13.7 dB, respectively, above the noise floor. The graph of FIG. 4 may be referred to as a rATOA (relative Amplitude and TOA) constellation because it includes a relative amplitude (or magnitude) value for one or more signals, as well as a relative TOA for the same signals.

Figure 5:
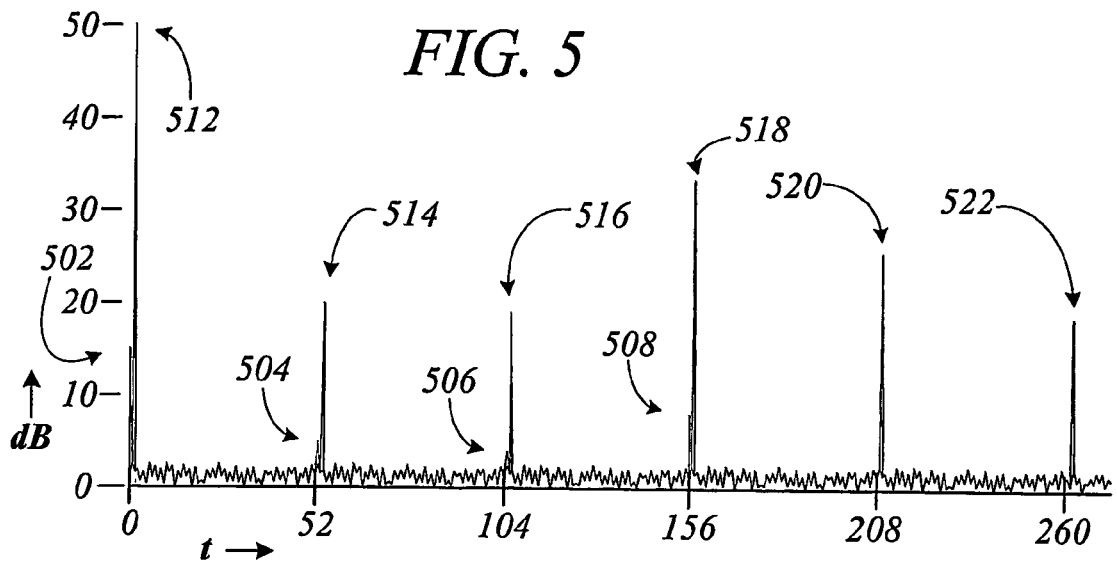
FIG. 5 is a rATOA constellation graph for signals received by a second mobile station within range of a repeater.

The rATOA constellation of FIG. 5 illustrates correlation peaks for the receiver MS2 112 (FIG. 1). Although MS2 112 is physically near to MS1 114, the peaks of its rATOA are very different from those of MS1 114 (FIG. 4), including differences in amplitude and in timing. Some of the amplitude differences are due to the amplification (20 dB) of the repeater (a net amplification due to repeater amplifiers such as a first repeater amplifier 108 and an amplifier portion of a server unit 110). Other amplitude differences are due to a directional attenuation caused by the gain pattern of the Yagi antenna 102 (presumed to range from 0 dB to −30 dB), while yet others are due to signal attenuation by the building (assumed to be −15 dB). Timing differences result from a 0.5>µs "excess delay" introduced by the repeater that is over and above a delay due to a direct (or LOS) signal path. Excess delays due to different repeaters vary widely, from shorter to much longer than this hypothetical example.

FIG. 5 indicates that MS2 112 measures correlation peaks that are due to direct transmissions from certain sectors that also transmit directly to MS1 114; however, these correlation peaks are reduced by 15 dB (in FIG. 5 as compared to FIG. 4) due to the building attenuation. Due to this attenuation, in two cases correlation peaks that are detected in the signal received by MS1 114 (as shown in FIG. 4) cannot be distinguished from the noise in the signal received by MS2 112.

Where a correlation peak due to a direct signal is present in the rATOA for MS2 112, a second correlation peak appears 0.5 µs later, the signal being delayed and also amplified by the repeater, but with a variable gain due to the directionality of the Yagi antenna. The effect of the repeater, net of the Yagi antenna directional gain, is as follows for signals transmitted from BS1, BS2, BS3, BS4 and BS5 respectively: +20 dB, +10 dB, 0 dB, +10 dB and +5 dB. (This simplified example does not account for the additional noise floor due to the repeater, and note that BS4 and BS5 are not shown, but remain at the locations ascribed to them in the description of FIG. 4.) The resulting sequence of correlation peaks in FIG. 5 is as follows: peak 502: 15 dB at 0 µs; peak 512: (repeated) 50 dB at 0.5 µs; peak 504: 5 dB at 53.1 µs; peak 514: 20 dB at 53.6 µs; peak 506: 4 dB at 105.2 µs; peak 516: 19 dB at 105.7 µs; peak 508: 8.3 dB at 158 µs; peak 518: 33.3 dB at 158.5 µs; peak 520: 25.7 dB at 210.8 µs; and peak 522: 18.7 dB at 263.4 µs. Note that the correlation peaks found at 210.3 µs and at 262.9 µs in FIG. 4 are indistinguishable from the noise in the rATOA shown in FIG. 5.

Figure 6:
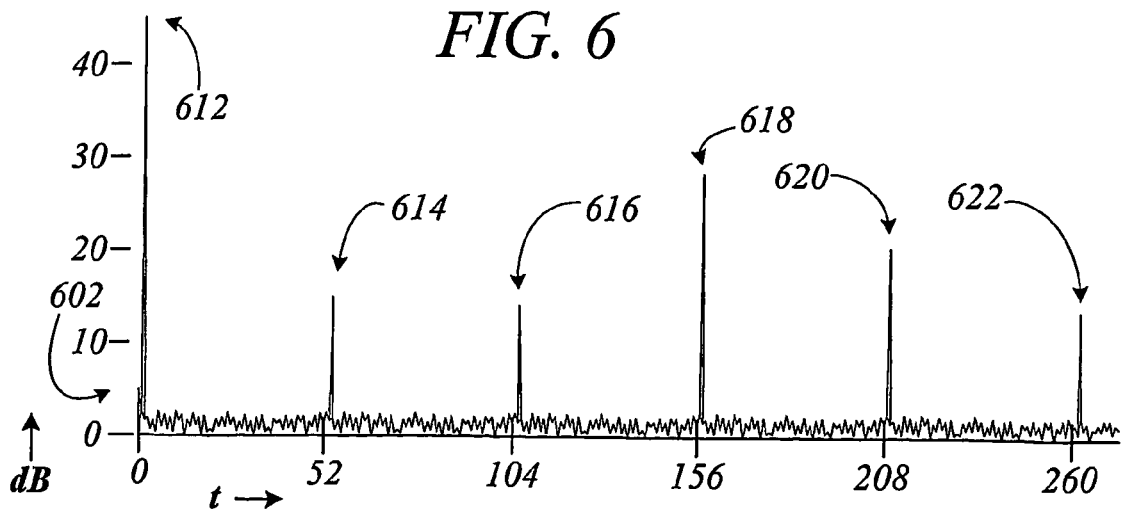
FIG. 6 is a rATOA constellation graph for signals received by the second mobile station when differently positioned within range of the repeater of FIG. 5.

The rATOA of FIG. 6 illustrates correlation peaks that may be expected if MS2 112 (referring also to FIG. 1) is disposed at a different location within the building 104, such as in the basement, where direct signals are attenuated 25 dB by the building, instead of 15 dB as was the case in FIG. 5. Because of such substantial attenuation, the only discernable non-repeated signal is received from BS1 sector "c." Moreover, and again referring to FIG. 1, the receiver MS2 112 is located farther from a repeater server unit 110 than it is when producing the rATOA constellation of FIG. 5. Accordingly, the correlation peaks of the repeated signals indicated in FIG. 6 retain substantially the same relative relationship, but are −5 dB lower, than corresponding correlation peaks in FIG. 5. The amplitude/TOA pairs for the correlation peaks in FIG. 6 thus include peak 602 (unrepeated): 5 dB at 0 µs; peak 612 (repeated, as are all the rest) 45 dB at 0.5 µs; peak 614: 10 dB at 53.6 µs; peak 616: 9 dB at 105.7 µs; peak 618: 28.3 dB at 158.5 µs; peak 620: 20.7 dB at 210.8 µs; and peak 622: 13.7 dB at 262.9 µs.

It will be understood that if MS2 112 is located in the top floor of the building 104, where direct signals are attenuated very little, then a correlation peak constellation would include large peaks corresponding (referring to FIG. 4) to the correlation peaks 402, 404, 406, 408, 410 and 412. Thus, it can be seen that within the coverage area of the repeater that includes donor antenna 102, amplifier 108 and server units 110, locating MS2 112 in different positions within the building 104 will result in different correlation peak constellations being obtained for MS2 112. The correlation peaks due to repeated transmissions, however, retain a relatively fixed relationship to one another, while non-repeated correlation peaks vary in relative position.

Deriving Repeater Signatures from rATOA Constellations

A repeater signature may be derived from the information in rATOA constellations by any of several methods. According to one, the presence of a number of correlation peaks following other correlation peaks by approximately the same delay suggests that the delayed peaks have experienced excess delay that is attributable to the signal traveling via a repeater. For example, the information shown in FIG. 5 may be interpreted in this light, and a conclusion may be drawn that the later-arriving signals have arrived via a repeater, even without independent evidence that the receiver is within the range of a repeater server. According to another technique, peaks of a rATOA constellation may be analyzed to determine a location of a receiver that accords with triangulation of such received signals. Given the resulting apparent location of the receiver, the actual signal strength of the received signal may be compared to a signal strength that would be expected at such location. If the actual signal strength is substantially higher than could reasonably be expected at such location, then it may be concluded that such signal arrived via a repeater. According to yet another technique, information from a plurality of receivers (or signals received at different times and locations but from the same receiver) may be compared. Those correlation peaks that maintain a substantially constant relative position, when other correlation peaks change substantially in relative position, may be deduced as due to signals transmitted via a common repeater. A "substantially constant relative position" may mean, for example, that the relative signal strength (rSS) and relative TOA (rTOA) between a set of correlation peaks is substantially constant.

Given the information illustrated in FIGS. 4, 5 and 6, it is readily possible to deduce a repeater signature according to any of the techniques outlined above, or by yet other methods. The repeater signature may take the form of a series of relative signal strength/TOA (rSS/rTOA) reference points that reflect an expected relationship for correlation peaks of signals transmitted via a particular repeater. The information presented in FIGS. 4, 5 and 6 permits the repeater signature reference points to be determined to be a series of pairs of data (relative signal strength in dB/relative TOA in µs) reflecting the relative position of the repeated correlation peaks.

Comparing Signature to Received rATOA Constellation

Figure 7:
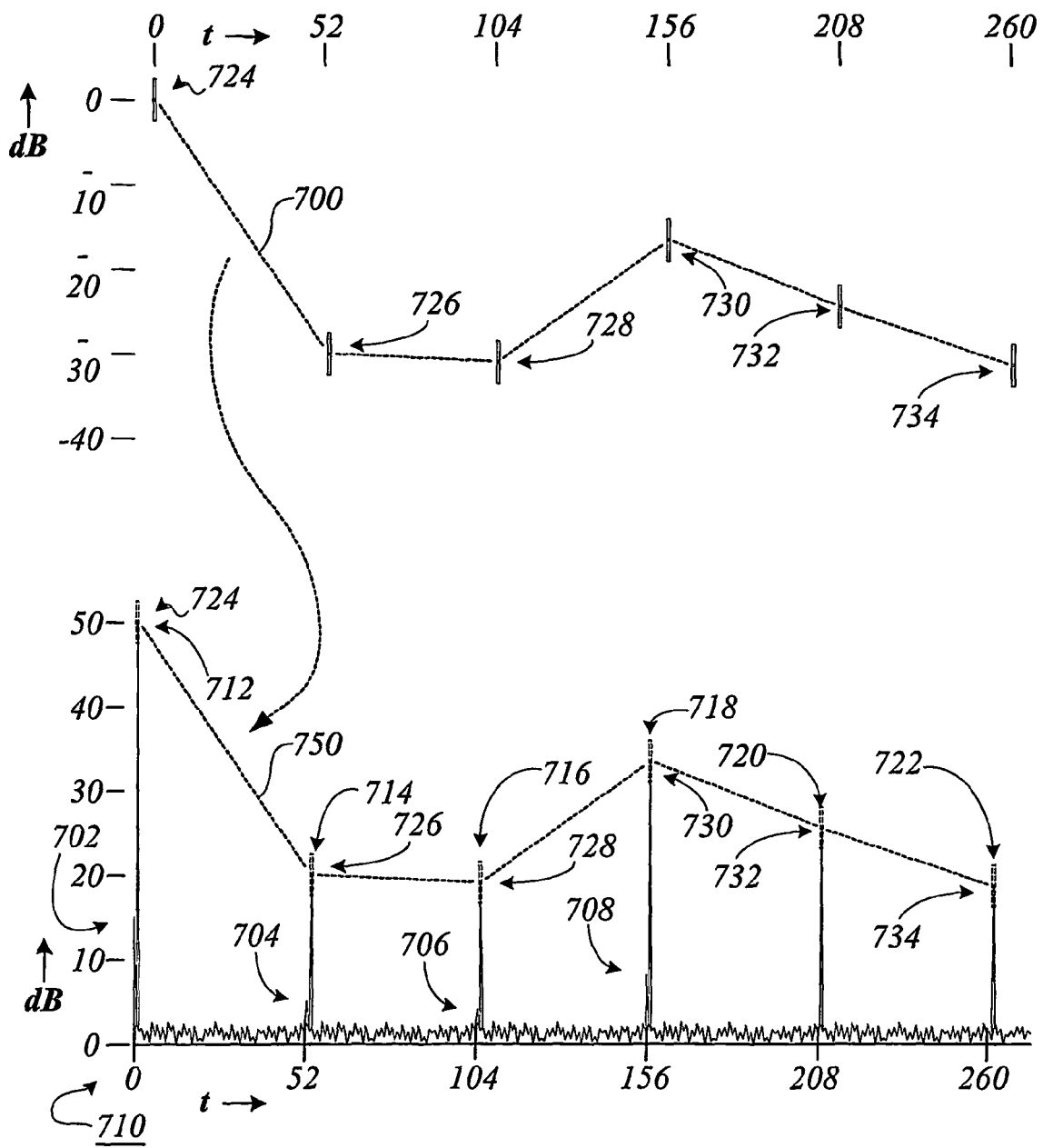
FIG. 7 graphically compares a rATOA constellation to a repeater signature.

FIG. 7 graphically illustrates a process of creating and comparing a "repeater signature" 700, as described above, to a rATOA derived from a subject receiver. In practical implementation, of course, the functions that are described graphically will more likely be performed by equivalent numeric comparisons that will be readily developed by a skilled person. The reference points of the signature 700 are graphically represented by the points in the center of windows 724, 726, 728, 730, 732 and 734, which points are located, respectively, at: (in dB/µs) 0/0, −30/53.6, −31/105.7, −16.7/158.5, −24.3/210.8, and −31.3/263.4, conforming to the relative positions of the repeated signal correlation peaks in, for example, FIG. 6. Dashed lines join the reference points of the signature 700 to illustrate that the relationship between the reference points is fixed. Furthermore, a window is disposed about each reference point to indicate a region in which a correlation peak would be expected in a rATOA of a receiver that is within range of a repeater server unit 110 (FIG. 1). The appropriate dimensions of such a window will depend upon empirical characteristics of the system in which employed, but for illustration the window extends +/−0.4 µs and +/−2.5 dB from each reference point.

FIG. 7 also graphically illustrates comparison of the signature 700 with a rATOA 710 of a receiver. As shown by the dotted line, the entire signature is superimposed upon the rATOA 710 of a receiver, as indicated by the "phantom" version 750 of the signature 700. Alignment may be performed by merely superimposing one reference point, such as reference point 724, upon one correlation peak of the rATOA 710, or may involve more complicated fitting techniques, whether known or later developed. After alignment of one point, the relative position of the windows in signature acceptance pattern 750 remains constant, and correlation peaks of the subject rATOA 710 are examined to see if they fit within the windows. As can be seen, the windows surrounding the reference points of the signature acceptance pattern 750, after alignment on the rATOA 710, encompass corresponding correlation peaks 712, 714, 716, 718, 720, and 722. Other correlation peaks are present in the rATOA 710, including 702, 704, 706 and 708, but these do not fit within the windows of the acceptance pattern 700.

Decisions as to whether a repeated signal has been received, and often as to which components of a composite received signal have traveled via a repeater, may be made based upon the "goodness" of the fit of the subject rATOA and the repeater signature 700. As illustrated in FIG. 7, for example, each of the six windows of the signature acceptance pattern 750 encompasses a corresponding correlation peak in the subject rATOA. This excellent agreement strongly suggests that the received signal from which the rATOA 710 is derived has received a signal transmitted from a repeater corresponding to the repeater signature 700. Moreover, it is highly likely that each of the signals corresponding to the correlation peaks 712, 714, 716, 718, 720 and 722 constitute a component of a composite signal transmitted by the repeater. By the same reasoning, the peaks 702, 704, 706 and 708 may be deduced to be from a source other than the repeater corresponding to the signature 700.

A receiver may, of course, receive signals from more than one repeater concurrently. In such case, two or more different repeater signatures should be able to be aligned upon the rATOA correlation peaks derived from the signals received by the subject receiver. If one repeater is relatively distant, it is possible that some of the lower amplitude correlation peaks will be missing from the acceptance windows. In such cases, finding corresponding peaks in only some of the acceptance windows may be deemed to indicate at least the presence of a repeated signal, and/or to indicate that the fitting peaks are probably repeated. Also, although a six-point repeater signature is illustrated above, either more or less points may be used for an adequate signature. If fewer points are available for the signature, then alternative corroborating information may be used to buttress a conclusion that the signals in question have been conveyed via a repeater. Such information may, for example, include the presence of pairs of peaks that are separated by a substantially uniform TOA difference, when that uniform TOA difference could reflect excess delay of a repeater. Another example of extra information is the presence of significantly higher amplitude peaks than would be predicted on the basis of estimates of an apparent location of a subject receiver. If the available information is insufficient to warrant a firm conclusion that particular signals traveled via a repeater, the information may still be used to identify a signal that is "suspected" of traveling via a repeater. Suspect signals may, for example, be withdrawn from location calculations and other ranging uses.

It is not unlikely that the correlation peak constellation of a receiver will have many more peaks, many of which are not part of the repeater signature. In order to reduce the acceptance window size, comparison may be performed in stages. First, relatively large windows about the signature reference points (e.g., +/−5 dB, +/−0.5 µs) may identify "candidate" peaks from a rATOA in a manner similar to that described above. The "candidate" peaks may then be used to adjust the position of the signature windows by a more refined alignment technique. For example, the signature reference points may be shifted with respect to the subject rATOA in order to maximize the number of close matches and eliminate probable outliers, by maximizing a sum of the inverses of distances between (shifted) reference points of the signature and corresponding candidate correlation peaks. After such improved alignment, the range around the reference points may then be reduced, for example to +/−2.0 dB and +/−0.15 µs, and correlation peaks outside such reduced range may be rejected as outliers. Such a technique may be useful when a rATOA derived from signals received by a receiver has many closely spaced correlation peaks.

As can be understood, an unlimited number of alternatives may be developed for comparing a correlation peak constellation with a repeater signature, each of which may be useful under different conditions. And, of course, if the signal parameters are other than the "signal strength" proxy and TOA described above, then a rather different algorithm will be necessary to determine that the reference of the repeater "signature" is sufficiently matched to signature characteristics of portions of a received signal to warrant a conclusion that such signal portions arrived via a repeater. The skilled person will develop an appropriate signature based upon predictable salient characteristics of available received signals, and will create an algorithm to compare actual received signals to such developed signature.

Creating a Signature Database

Many communications systems, particularly cellular telephone systems, employ numerous repeaters. Information derived by a receiver about the signals it receives, such as the correlation peak constellations described above, may need to be compared to many possible different repeater signatures. Accordingly, it will be useful to develop a database of information about repeaters. Such database will, first, include signature references for various repeaters, which may suffice (when compared to received-signal information) to determine that a repeated signal has been received, and (depending upon the characteristics used) possibly to identify which particular signals have been repeated. Such a database may, of course, include much further information, such as the location and/or geometric configuration of each repeater. A history of reported signals matching the repeater signature may be maintained, and used to automatically update the repeater signature if it changes over time. Such a database may be maintained centrally, and may be forwarded to a receiver in relevant part as needed. If the database is maintained centrally (i.e., at a communication system location other than the receivers) then it may be convenient to simply convey signal information from a receiver in question to computing facilities associated with, or coupled to, such database. For example, a receiver may generate a correlation peak constellation, and then convey such constellation to central processing facilities, where comparisons may be performed if needed to determine if some of the received signals are repeated.

Several techniques for creating a database, such as described above, are briefly described in order to suggest the wide variety of methods that may be employed. First, algorithms may be developed for automatic determination that signals are repeated. Such algorithms may include the use of independent location information, such as may be provided by GPS capabilities of a receiver. Such information may be utilized to determine expected rTOAs for pilot signals from known base stations. TOAs that are delayed more than predicted will suggest a repeated signal, as will relative signal strength (rSS) indications that are higher than predicted. Location estimates may be derived from calculations based on signals (in either direction) between a MS and a plurality of BSs. The presence of repeated signals may be inferred when the results of some location estimate calculations produce impossible or inconsistent locations, particularly when the apparently impossibility or inconsistency of the estimated location can be reconciled by postulating excess signal travel delay and signal amplification. Further, if receivers are mobile, then comparison of signals from particular receivers that report signal conditions in which some signals maintain a relative consistency, while other signals vary apparently randomly with respect to each other, may imply that the signals maintaining relative consistency are in fact conveyed via a repeater. These techniques, and many others, may be used to analyze data so as to automatically determine the signatures of repeaters, and gradually build up a database of such information.

Another technique for creating a database of repeater information (particularly signature information) may include simply operating a known receiver near a known repeater. Information about the received signal may be analyzed to determine a repeater signature. In some cases this may be done with a single use of the receiver (such as a cellular telephone). For example, for a receiver at a known location, location information may suffice to predict TOA and signal strength for non-repeated signals. Strong signals that diverge from expectations may be attributed to the repeater.

It may also be useful to collect information from a plurality of different places within a repeater coverage area, so that the information about the received signals may be compared. Upon comparison, signals that maintain consistent signal strength with respect to each other are likely repeated, while signals whose signal strength varies independently of other signals are less likely repeated. If the test locations are sufficiently separated to provide discernable timing differences, then repeated signals may be distinguished from nonrepeated signals by consistent relative timing relationships (due to signals from a particular repeater) versus inconsistent relative timing relationships (due to signals from physically different sources, probably direct). In a cellular telephone system, these techniques may require little more than making one or two calls from known repeater locations, and analyzing information derived from the signals received by the mobile station and/or received by base stations from the mobile station. The nature of the information, and of the analysis, will depend upon the signal characteristics that are used for signatures. For example, in an exemplary CDMA cellular telephone system, the information will generally include relative amplitude and relative time of arrival for various signals. The database will thus ultimately contain information that is relevant to the particular signature characteristics of the system employing the database.

Part of creating a database of repeater information may involve creating an initial estimate of a repeater signature, followed by refinement. An initial determination of a repeater signature may be made according to the techniques described above. Information derived from a signal received by a subject receiver may then be compared to the initial signature; the acceptance windows for such comparison may be somewhat enlarged. Upon finding a match, the information derived from the subject receiver may be incorporated to modify the parameters that define the repeater signature. In this manner, at least some changes in transmission systems and environments may be accommodated by the database of signatures.

Using Repeated Signal Information for Ranging

When portions of a received signal have been identified as having been transmitted via a particular repeater, further information regarding the repeater may make it possible to utilize such signals for locating purposes. If a computing system is configured to calculate a location of the receiver based upon characteristics about the received signals such as TOA, then the fact that certain signals have arrived via a repeater may invalidate the use of the characteristics of such signals for locating purposes (because the path is not direct). However, if the actual path is identified, including excess signal delay caused by the repeater, then such signals may be reinterpreted in light of such actual path to aid with calculations for estimating locations. Those signals that are determined to have arrived via the repeater may be omitted from such calculations, and "reconstructed" signal characteristics may be substituted. The reconstructed signal characteristics may, for example, subtract the known delay for each signal from source to repeater server antenna from the measured delay. The average of all such calculations will provide an indication of delay from the repeater server antenna to the receiver. Finally, the geographical location of the repeater server antenna may be used, together with the calculated delay from server to receiver, to develop reconstructed data for use in calculating location.

Compensating for Repeaters Having an Inadequate Signature

Signatures may not always be readily deduced from the signals transmitted via a repeater. Referring to FIG. 2, for example, the donor antenna 204 may be so highly directional that practically no signals other than those from sector "a" of BS3 210 reach the repeater 212. If a signal 230 from sector "b" of BS3 210 happens to be reflected from a nearby object (e.g., an obstruction 232) toward the donor antenna 204, such reflected signal might constitute a second signal that could be used to form part of a signature for the repeater 212. However, even these two signals may not be sufficient for a repeater signature to reliably determine whether a signal (received by a receiver such as MS1 222) is repeated or not. In such case it may be useful to consider information other than just the repeater signature. Such other information may, for example, include a consideration that a substantially weaker signal (such as from BS3 sector "a") arrives slightly prior to a stronger signal, particularly if a plurality of such "early weak"/"late strong" peak pairs is identified.

Alternatively, a repeater such as the repeater 212 may be modified to add a signature. This may be accomplished by changing modulation of a repeated signal, adding data to a repeated signal, or by other techniques that involve substantial modification to the repeater. However, if signatures of composite signals are employed by a communication system, it may be a simple matter to create a composite signal on the donor side of the repeater 212 that has sufficient information to establish a reliable signature. For example, in FIG. 2 the feed from the primary donor antenna 204 may be mixed with a small omnidirectional antenna output. Such an omnidirectional antenna may be no more than a stub of appropriate length that is tapped to the feed from the donor antenna 204 to the amplifier 206. Such a small omnidirectional antenna would pick up signals from BS2 226 and BS1 228, and perhaps others that are not shown. This would result in a composite signal having enough components to create a reliably identifiable signature for the repeater.

Creating a composite signal for a particular repeater may proceed differently, depending upon the configuration of the particular repeater. For example, the repeater configuration shown in FIG. 3 involves a donor pickup 306 that may (or may not) deliver a signal from an antenna (314). If the donor pickup is received from a donor antenna 314 then mixing of signals from other sources may be effected as described with respect to FIG. 2, using a multidirectional antenna to pick up signals from other base stations. However, the configuration shown in FIG. 3 has special opportunities, because the base station BS1 304 has different sectors, in addition to the sector providing the primary signal, and thus has more than one signal available at substantial power. Signals from the other sectors of BS1 304 may be combined (by any attenuation and mixing techniques) to produce a composite signal having sufficient information to form a reliable signature. Such mixing may be accomplished by adding the output of a small omnidirectional antenna to a signal from the coupler 312, or from the coupler 308. For example, the antenna 314 may be an omnidirectional antenna that is not closely coupled to a transmit antenna of the base station, but is instead permitted to pick up signals from all of the sectors of the BS1 304, as well as signals that may be received from other base stations such as the base stations 324 and 326. The primary signal for the repeater may be provided from the coupler 308 or the coupler 312, resulting in a composite signal being provided to the donor pickup 306. Alternatively, signals may be tapped from couplers of other sectors, and mixed into a primary sector signal to form the identifiable composite.

Yet another alternative may be particularly useful for situations in which only a single signal is available. Distinct signals may be established from an existing signal by variously delaying, and if desired also variously attenuating, the existing signal, and remixing these distinct signals as a composite. Such creation of distinct signals may be effected by simple delay lines of varying duration. An advantage of such an approach is that a simple mechanical modification of a repeater may provide entirely adequate information for a repeater signature without requiring any modification of the modulation or data of the repeated signal. In some cases the delayed versions of the primary signal may be utilized to reduce the net bit error rate of the receiver for the primary signal by providing a redundancy, a form of diversity transmission. If used only for signature purposes, the delayed signals may be sufficiently attenuated so that interference with the primary signal is relatively negligible. This "delayed signal" alternative may be used in combination with other techniques to assist in obtaining sufficient signal components to establish a composite signal that is reliably identifiable. Such an arrangement provides a further potential advantage, because the delayed versions of the signal constitute a form of diversity that can be exploited to improve reception. Receivers may be designed to process each delayed version separately and then to statistically combine the separately evaluated signals to arrive at an improved estimate of the transmitted signal.

The foregoing description illustrates exemplary implementations, and novel features, of aspects of a method and apparatus for determining repeater use in wireless communications. While some suggestions are provided for alternative uses and implementations of the method and apparatus, it is of course not practical to list or describe such alternatives exhaustively. Accordingly, the scope of the presented invention should be determined only by reference to the appended claims, and should not otherwise be limited by features illustrated herein except insofar as such limitation is recited in an appended claim.

While the above description has pointed out novel features of the invention as applied to various embodiments, the skilled person will understand that various omissions, substitutions, and changes in the form and details of the methods and systems illustrated may be made without departing from the scope of the invention. For example, the skilled person will be able to adapt the details described herein to communications systems using a wide range of modulation techniques, transmitter and receiver architectures, and generally any number of different formats.

The various techniques set forth above may be performed within, or by, any appropriate communications facilities. Different facilities may divide tasks up in different ways than those illustrated. For example, receiver signal processing may be performed in any number of processing modules or subsections. Indeed, a common approach to such signal processing includes sending information about received signals back to a base station via a reverse communication path that is not described in detail, and thereupon providing the signal information to a central processing module. The location of such processing is therefore entirely unimportant. Receiver signal processing may similarly be performed in different orders and at different locations. Any appropriate techniques for establishing signature characteristics for a repeater signal, and for determining and comparing the established signature characteristics with information from signals received at a receiver, may be used in conjunction with the techniques and apparatus described above.

Each practical and novel combination of the elements described hereinabove, and each practical combination of equivalents to such elements, is contemplated as an embodiment of the invention. Because many more element combinations are contemplated as embodiments of the invention than can reasonably be explicitly enumerated herein, the scope of the invention is properly defined by the appended claims rather than by the foregoing description. All variations coming within the meaning and range of equivalency of the various claim elements are embraced within the scope of the corresponding claim. Specific combinations of elements are set forth as claims, appended below, to define the invention in various aspects. Each claim is intended to encompass any system or method that differs only insubstantially from the literal language of such claim, so long as such system or method is not, in fact, an embodiment of the prior art. To this end, each described element in each claim should be construed as broadly as possible, and moreover should be understood to encompass any equivalent to such element insofar as possible without also encompassing the prior art.

The invention claimed is:

1. A method of determining that a signal has arrived at a receiver via a repeater, comprising:
   a) receiving a signal at a wireless receiver, wherein the received signal includes signals originating from a plurality of distinct transmission stations,
   b) comparing a predetermined pattern to information derived from the received signal, wherein the information is based on the signals originating from the plurality of distinct transmission stations; and
   c) determining, based upon the predetermined pattern substantially matching the information derived from the received signal, that at least a portion of the received signal traveled via a repeater, and
   wherein the predetermined pattern reflects a composite signal comprising a primary transmission signal of a base station transmitter mixed with a different secondary signal.

2. The method of claim 1, wherein the different secondary signal is a signal obtained from a distinct base station transmitter.

3. A method of determining that a signal has arrived at a receiver via a repeater, comprising:
   a) receiving a signal at a wireless receiver, wherein the received signal includes signals originating from a plurality of distinct transmission stations,
   b) comparing a predetermined pattern to information derived from the received signal, wherein the information is based on the signals originating from the plurality of distinct transmission stations; and
   c) determining, based upon the predetermined pattern substantially matching the information derived from the received signal, that at least a portion of the received, signal traveled via a repeater, and
   wherein the predetermined pattern reflects a relationship between time of arrival of signals obtained from distinct base station transmitters.

4. A method of determining that a signal has arrived at a receiver via a repeater, comprising:
   a) receiving a signal at a wireless receiver, wherein the received signal includes signals originating from a plurality of distinct transmission stations,
   b) comparing a predetermined pattern to information derived from the received signal, wherein the information is based on the signals originating from the plurality of distinct transmission stations; and
   c) determining, based upon the predetermined pattern substantially matching the information derived from the received signal, that at least a portion of the received signal traveled via a repeater, and
   wherein the predetermined pattern reflects relative strength of signals obtained from distinct base station transmitters.

5. The method of claim 4, wherein the predetermined pattern further reflects relative time of arrival of signals from a multiplicity of different base station transmitters.

6. The method of claim 5, wherein the signals are pilot symbols transmitted synchronously from a plurality of different base stations of a cellular telephone system.

7. Apparatus for determining that a signal has arrived at a receiver via a repeater, comprising:
   a) a receiver configured to derive information from a received wireless signal, wherein the received wireless signal includes signals originating from a plurality of distinct transmission sources, and wherein the information is based on the signals originating from the plurality of distinct transmission stations; and
   b) a processing system in communication with the receiver and configured to:
      i) compare the information derived from the received signal to a stored set of predetermined parameters, and
      ii) determine that at least a portion of the received signal arrived via a repeater if the set of predetermined parameters describes an appropriate part of the information derived from the received signal, and
   wherein the derived information reflects a relative time of arrival of distinct pilot sequences within the received signal.

8. Apparatus for determining that a signal has arrived at a receiver via a repeater, comprising:
   a) a receiver configured to derive information from a received wireless signal, wherein the received wireless signal includes signals originating from a plurality of distinct transmission sources, and wherein the information is based on the signals originating from the plurality of distinct transmission stations; and
   b) a processing system in communication with the receiver and configured to:
      i) compare the information derived from the received signal to a stored set of predetermined parameters, and
      ii) determine that at least a portion of the received signal arrived via a repeater if the set of predetermined parameters describes an appropriate part of the information derived from the received signal, and
   wherein the derived information reflects relative signal strength of distinct pilot sequences within the received signal.

9. The apparatus of claim 8, wherein the distinct pilot sequences include pilot sequences transmitted by distinct base station transmitters, and the derived information reflects a relative time of arrival of the distinct pilot sequences.

10. Apparatus for determining that a signal has arrived at a receiver via a repeater, comprising:
    a) a receiver configured to derive information from a received wireless signal, wherein the received wireless signal includes signals originating from a plurality of distinct transmission sources, and wherein the information is based on the signals originating from the plurality of distinct transmission stations; and b) a processing system in communication with the receiver and configured to:
   i) compare the information derived from the received signal to a stored set of predetermined parameters, and
   ii) determine that at least a portion of the received signal arrived via a repeater if the set of predetermined parameters describes an appropriate part of the information derived from the received signal, and
wherein the stored set of predetermined parameters reflects a composite signal comprising a primary transmission signal of a base station transmitter mixed with a different secondary signal.

11. The apparatus of claim 10, wherein the information derived from the received signal includes time of arrival and relative signal strength for each of a multiplicity of signals from distinct signal sources.

12. Apparatus for determining that a signal has arrived at a receiver via a repeater, comprising:
   a) a receiver configured to derive information from a received wireless signal, wherein the received wireless signal includes signals originating from a plurality of distinct transmission sources, and wherein the information is based on the signals originating from the plurality of distinct transmission stations; and
   b) a processing system in communication with the receiver and configured to:
      i) compare the information derived from the received signal to a stored set of predetermined parameters, and
      ii) determine that at least a portion of the received signal arrived via a repeater if the set of predetermined parameters describes an appropriate part of the information derived from the received signal,
   wherein the information derived from the received signal includes time of arrival and relative signal strength for each of a multiplicity of signals from distinct signal sources, and
   wherein the receiver is a GPS-enabled cellular telephone handset configured to process CDMA signals, the multiplicity of signals include pilot signals from different CDMA base station transmitters, and the relative signal strength is related to chip energy divided by total signal.

13. A method of creating a database having predetermined patterns for a method of determining that a signal has arrived at a receiver via a repeater, the method comprising:
   a) receiving a signal at a wireless receiver, wherein the information derived from the received signal comprises a constellation of signal parameters for signal components of a composite signal;
   b) identifying a pattern within information derived from the received signal; and
   c) storing parameters that describe the identified pattern as a reference repeater signature within the database.

14. The method of claim 13, wherein the constellation of signal parameters includes an indication of signal strength and an indication of time of arrival for each of a plurality of components of the composite signal.

15. The method of claim 14, wherein step b) further comprises identifying within the composite signal a plurality of component signal pairs, each pair arriving at times separated by a possible repeater excess delay.

16. The method of claim 13, wherein step b) further comprises:
   i) deriving information about location of the wireless receiver from parameters of a first set of component signals, and
   ii) determining that parameters of a second set of component signals are inconsistent with the derived location of the wireless receiver.

17. The method of claim 13, wherein the wireless receiver is within a coverage area of a repeater server, and step b) further comprises comparing the information derived from the received signal with previous information derived from a signal received by a receiver differently located within the coverage area of the repeater server.

18. The method of claim 13, further comprising revising an existing signature within the database based upon information derived from signals received by receivers determined on the basis of matching to the existing signature to be within a coverage area of a repeater associated with the existing signature.

19. Apparatus for creating a database having predetermined patterns for use in a method of determining that a signal has arrived at a receiver via a repeater, the apparatus comprising:
   a) a receiver configured to derive information from a received wireless signal, wherein the information derived by the receiver comprises a constellation of signal parameters for signal components of a composite signal; and
   b) a processing system configured to:
      i) obtain the derived information from the receiver,
      ii) analyze the derived information to identify a pattern of at least a portion of the derived information, and
      iii) store a description of the identified pattern in a database as a repeater signature reference pattern for determining if subsequent received signals arrived via a repeater.

20. The apparatus of claim 19, wherein the receiver is further configured to derive information including an indication of signal strength and an indication of time of arrival for each of a plurality of components of the composite signal.

21. The apparatus of claim 19, wherein the processing system is further configured to:
   i) derive information about location of the wireless receiver from parameters of a first set of component signals, and
   ii) determine that parameters of a second set of component signals are inconsistent with the derived location of the wireless receiver.

22. The apparatus of claim 19, wherein the receiver is known to be located within a coverage area of a server of a repeater, and wherein the processing system is further configured to compare the information derived from the signal received from the receiver with information previously derived from a different signal received by a receiver differently located within the coverage area of the repeater.

23. The apparatus of claim 19, wherein the processing system is further configured to
   i) determine that a subject receiver is within a coverage area of a repeater by comparing information derived from a signal received by the subject receiver with an existing repeater signature of the database, and
   ii) thereafter use the derived information of the subject receiver to modify the existing repeater signature.

24. Apparatus for determining that a signal has arrived at a receiver via a repeater, comprising:
- means for receiving a wireless signal including signals originating from a plurality of distinct transmission stations,
- means for comparing a predetermined pattern to information derived from the received wireless signal, wherein the information is based on the signals originating from the plurality of distinct transmission stations; and
- means for determining, based upon the predetermined pattern substantially matching the information derived from the received wireless signal, that at least a portion of the received wireless signal traveled via a repeater, and
- wherein the predetermined pattern reflects a composite signal comprising a primary transmission signal of a base station transmitter mixed with a different secondary signal.

25. Apparatus for creating a database having predetermined patterns for use in the method of claim 13, comprising:
- means for receiving a wireless signal including signals originating from a plurality of distinct transmission stations;
- means for identifying a pattern within information derived from the received wireless signal, wherein the information derived from the received signal comprises a constellation of signal parameters for signal components of a composite signal; and
- means for storing parameters that describe the identified pattern as a reference repeater signature within the database.

* * * * *